United States Patent
Yang

[11] Patent Number: 6,125,659
[45] Date of Patent: Oct. 3, 2000

[54] APPARATUS FOR MANUFACTURING ERBIUM-DOPED OPTICAL FIBERS

[75] Inventor: Jin-Seong Yang, Daegukwangyeok, Rep. of Korea

[73] Assignee: SamSung Electronics Co., Ltd., Suwon, Rep. of Korea

[21] Appl. No.: 08/832,620

[22] Filed: Mar. 31, 1997

[30] Foreign Application Priority Data

Mar. 30, 1996 [KR] Rep. of Korea .................. 96-9613

[51] Int. Cl.⁷ .................................. C03B 37/014
[52] U.S. Cl. ............................... 65/390; 65/399
[58] Field of Search .................. 65/399, 390, 417, 65/393

[56] References Cited

U.S. PATENT DOCUMENTS

| | | | |
|---|---|---|---|
| 4,632,684 | 12/1986 | Karbassiyoon | 65/399 |
| 4,669,821 | 6/1987 | Blair | 65/417 |
| 4,952,225 | 8/1990 | LeSergent | 65/399 |
| 5,047,076 | 9/1991 | Cognolato | 65/418 |
| 5,058,976 | 10/1991 | Digiovani . | |
| 5,131,936 | 7/1992 | Cognolato et al. . | |
| 5,284,500 | 2/1994 | Okamura et al. . | |
| 5,296,012 | 3/1994 | Antos et al. . | |
| 5,314,518 | 5/1994 | Ito et al. . | |
| 5,526,459 | 6/1996 | Tanaka et al. . | |
| 5,711,782 | 1/1998 | Okamura | 65/399 |

FOREIGN PATENT DOCUMENTS

| | | |
|---|---|---|
| 0 372 550 | 6/1990 | European Pat. Off. . |
| 466 932 A1 | 1/1992 | European Pat. Off. . |
| 0 536 631 A1 | 4/1993 | European Pat. Off. . |

OTHER PUBLICATIONS

Townsend, Solution–doping technique for fabrication of rare–earth–doped opitcal fibers, Electronic Letters, Mar. 26, 1987, p 329–331.

Derwent Abstract of JP 63–144137 Seiko Epson, Jun. 1988.

Derwent Abstract, WPI Accession No. 92–076647, dated 1997, for Japanese Patent JP4021532A, Jan. 24, 1992, and for JP90127579A, dated May 16, 1990.

*Primary Examiner*—John Hoffmann
*Attorney, Agent, or Firm*—Robert E. Bushnell, Esq.

[57] ABSTRACT

A method of and an apparatus for erbium-doped optical fibers usable as an optical amplifier allowing optical signals to be directly amplified by themselves, which method and apparatus are capable of reducing manufacturing time while increasing productivity. The methods includes the steps of closing one end of a quartz tube deposited with a clad layer and a core layer, injecting a solution containing erbium and other additive elements into the quartz tube, thereby absorbing the solution in the core layer, removing the solution from the quartz tube after a predetermined period of time elapses, clamping the quartz tube to a clamping chuck via a connecting tube which is connected to the quartz tube, opening again the closed end of the quartz tube, injecting a large amount of gas into the quartz tube, heating the connecting tube by the heating source to a predetermined temperature, thereby warming the gas introduced in the quartz tube, rotating the clamping chuck to uniformly heat the quartz tube, thereby slowly drying the solution absorbed in the core layer of the quartz tube, and heating again the quartz tube by the heating source, thereby softening the quartz tube. Thereafter, the quartz tube may be collapsed into a condensed erbium-doped optical fiber preform, or both ends of the quartz tube may be completely sealed to form an erbium-doped optical fiber preform having a hollow cylindrical structure.

13 Claims, 4 Drawing Sheets

APPARATUS FOR MANUFACTURING ERBIUM-DOPED OPTICAL FIBERS

CLAIM OF PRIORITY

This application makes reference to, incorporates the same herein, and claims all benefits accruing under 35 U.S.C §119 from an application entitled Method Of And Apparatus For Manufacturing Erbium-Doped Optical Fibers earlier filed in the Korean Industrial Property Office on Mar. 30, 1996, and there duly assigned Ser. No. 96-9613 by that Office.

BACKGROUND OF THE INVENTION

1. Field of the Invention

The present invention relates to a method of and an apparatus for manufacturing optical fibers, and more particularly to a method of and an apparatus for manufacturing erbium-doped optical fibers usable as an optical amplifier allowing optical signals to be directly amplified by themselves, which method and apparatus are capable of reducing manufacturing time while increasing productivity.

2. Description of the Related Art

Where a long-distance signal transmission is performed in an ultrahigh-speed information communications network or in a long-distance communications network or where an optical signal generated at one area branches off in various directions in such a communications network, the optical signal is reduced in intensity during its transmission from its initial intensity. Accordingly, it is necessary to greatly amplify the optical signal. In order to satisfy such a necessity, semiconductor amplifiers or optical amplifiers are employed. In particular, semiconductor amplifiers have been widely used as an essential element of ultrahigh-speed information communications networks because they can directly amplify optical signals to a desired high level without requiring a complicated signal processing.

Such optical amplifiers employ optical fibers such as optical fibers containing erbium (Er) which is a medium serving to internally amplify an optical signal. Such erbium-doped optical fibers may be manufactured using various methods. One such method is described in U.S. Pat. No. 5,526,459 to Daiichirou Tanaka, et al. entitled Erbium-Doped Silica Optical Fiber Preform which describes making an Erbium-doped optical fiber using the VAD (Vapor-phase axial-deposition) process to dope the optical fiber. The most frequently used and reliable method, however, is a modified chemical vapor deposition (MCVD) method as described in U.S. Pat. No. 5,284,500 to Kouji Okamura, et al., entitled Process For Fabricating An Optical Fiber Preform.

The following description will be made in conjunction with the case wherein erbium-doped optical fibers are manufactured using a MCVD method. In accordance with the method using the MCVD method, a connecting tube is first clamped at one end thereof on a clamping chuck, a quartz tube, which is called "a supporting tube", is connected at the other end of the connecting tube, wherein the quartz tube is used to manufacture an erbium-doped optical fiber substrate. Thereafter, raw material such as $SiCl_4$ or $GeCl_4$ transported from a raw supply system by a flow of oxygen is supplied to the interior of the quartz tube. Subsequently, the quartz tube is heated by an external heating source (for example, an oxygen/hydrogen burner) while rotating. During the heating process, an oxidation reaction occurs in the interior of the quartz tube.

In accordance with the oxidation reaction, particles of quartz-based oxides containing impurities are produced. The oxide particles exist in the form of a deposition on the inner surface of the quartz tube. As the heating process is further carried out while the heating source reciprocates in a longitudinal direction on the quartz tube, the particulate deposition is sintered on the inner surface of the quartz tube while being transparentized. As a result, a thin glass layer is formed on the inner surface of the quartz tube. Thereafter, the above procedure is repeated until the glass layer on the inner surface of the quartz tube has a desired thickness. During the formation of the glass layer, a portion of the glass layer corresponding to a clad layer is first formed, and a portion of the glass layer corresponding to a core layer is then formed.

In order to manufacture erbium-doped optical fibers capable of directly amplifying optical signals to a desired high level without requiring a complicated signal processing by use of the quartz tube formed with the clad layer and core layer, the quartz tube is separated from the clamping chuck after being closed at its one end. Thereafter, a solution containing erbium and other additive elements is injected into the interior of the quartz tube closed at one end thereof. The quartz tube is then maintained in the above-mentioned condition for a desired period of time so as to allow the erbium to be absorbed in the core layer to a desired amount. After a desired period of time elapses, the solution is removed from the quartz tube. At this time, the core layer has absorbed the solution containing the erbium and other additive elements. Subsequently, the quartz tube is clamped again on the clamping chuck, and its closed end is then opened. The clamping chuck then rotates to rotate the quartz tube so as to prevent the solution absorbed in the core layer from being sporadically concentrated in the core layer. Thereafter, the quartz tube is maintained for a long period of time as it is, so that the solution absorbed in the quartz tube can be air-dried. After the erbium absorbed in the quartz tube is completely dried in the above process, the quartz tube is heated again at a high temperature using the heating source, so that it is softened. Thereafter, both ends of the quartz tube are completely sealed. Thus, an erbium-doped optical fiber substrate having a hollow cylindrical structure is obtained. However, the above-mentioned method involving the step of drying the solution containing the erbium and other additive elements absorbed in the quartz tube is problematic is in that a long period of time is required to carry out the drying step because the drying step is processed in a natural air-dried state. This results in a lengthened manufacturing time of erbium-doped optical fiber substrates. As a result, the manufacturing productivity of erbium-doped optical fiber substrates is degraded. Furthermore, the costs of erbium-doped optical fiber substrates increase. In addition, a sporadic undrying phenomenon may occur because the quartz tube is dried in a natural air-dried state. Such a sporadic undrying phenomenon results in a non-uniform refractivity distribution.

Another method for manufacturing a substrate of erbium-doped optical fibers using the MCVD method will now be described. In accordance with this method using the MCVD method, a connecting tube is first clamped at one end thereof on a clamping chuck. A quartz tube, which is called "a supporting tube", is connected at the other end of the connecting tube. The quartz tube is used to manufacture an erbium-doped optical fiber substrate. Thereafter, raw material such as $SiCl_4$ or $GeCl_4$ transported from a raw supply system by a flow of oxygen is supplied to the interior of the quartz tube. Subsequently, the quartz tube is heated by an external heating source (for example, an oxygen/hydrogen burner) while rotating. During the heating process, an oxidation reaction occurs in the interior of the quartz tube.

In accordance with the oxidation reaction, particles of quartz-based oxides containing impurities are produced. The oxide particles exist in the form of a deposition on the inner surface of the quartz tube. As the heating process is further carried out while the heating source reciprocates in a longitudinal direction on the quartz tube, the particle deposition is sintered on the inner surface of the quartz tube while being transparentized. As a result, a thin glass layer is formed on the inner surface of the quartz tube. Thereafter, the above procedure is repeated until the glass layer on the inner surface of the quartz tube has a desired thickness.

During the formation of the glass layer, a portion of the glass layer corresponding to a clad layer is first formed, and a portion of the glass layer corresponding to a core layer is then formed. In order to manufacture erbium-doped optical fibers capable of directly amplifying optical signals to a desired high level without requiring a complicated signal processing by use of the quartz tube formed with the clad layer and core layer, the quartz tube is separated from the clamping chuck after being closed at its one end. Thereafter, a solution containing erbium and other additive elements is injected into the interior of the quartz tube closed at one end thereof. The quartz tube is then maintained in the above-mentioned condition for a desired period of time so as to allow the erbium to be absorbed in the core layer to a desired amount. After a desired period of time elapses, the solution is removed from the quartz tube. At this time, the core layer has absorbed the solution containing the erbium and other additive elements. Subsequently, the quartz tube is clamped again on the clamping chuck, and its closed end is then opened. The clamping chuck then rotates to rotate the quartz tube so as to prevent the solution absorbed in the core layer from being sporadically concentrated in the core layer. During the rotation of the quartz tube, the outer surface of the quartz tube is slowly heated by a heater at a low temperature while the heater reciprocates in a longitudinal direction on the quartz tube, thereby causing the solution absorbed in the quartz tube to be slowly dried.

After the erbium absorbed in the quartz tube is completely dried in accordance with the above process, the quartz tube is heated again by a heating source at a high temperature, so that it is softened. Thereafter, both ends of the quartz tube are completely sealed. Thus, an erbium-doped optical fiber substrate having a hollow cylindrical structure is obtained. Where the solution containing the erbium and other additive elements absorbed in the quartz tube is dried in accordance with the above-mentioned method, it is possible to greatly reduce the drying time, as compared to the method using the natural air-drying process. This is because the outer surface of the quartz tube is slowly heated by the heater at a warm temperature while the heater reciprocates in a longitudinal direction on the quartz tube, thereby causing the solution absorbed in the quartz tube to be dried. Even in this case, however, several hours are required to dry the quartz tube. As a result, this method is also problematic in that a long period of time is taken to manufacture erbium-doped optical fiber substrates. As a result, the manufacturing productivity of erbium-doped optical fiber substrates is degraded. Furthermore, the costs of erbium-doped optical fiber substrates increase. In addition, a sporadic undrying phenomenon may occur because the quartz tube is dried using heat generated by the heater. Such a sporadic undrying phenomenon results in a non-uniform refractivity distribution. Since the heater is used to dry the quartz tube, additional time and costs are required to install the heater. Moreover, an erroneous installation of the heater may cause errors in the manufacture of erbium-doped optical fiber substrates.

U.S. Pat. No. 5,296,012 to A. Joseph Antos, et al., entitled Method Of Making Optical Waveguide Preforms and U.S. Pat. No. 5,314,518 to Masumi Ito, et al., entitled Method For Producing Glass Preform For Optical Fibers utilize known MCVD methods for doping optical fibers with a rare earth material such as Erbium.

SUMMARY OF THE INVENTION

Therefore, an object of the invention is to provide a method of and an apparatus for manufacturing erbium-doped optical fibers, which method and apparatus are capable of uniformly drying a solution containing erbium and other additive elements absorbed in the core layer of a substrate.

Another object is to provide a method of and an apparatus for manufacturing erbium-doped optical fibers, wherein the interior of a quartz tube is dried using oxygen and a heating source, thereby reducing the drying time.

Yet another object is to provide a method of and an apparatus for manufacturing erbium-doped optical fibers, wherein the time taken to manufacture an erbium-doped optical fiber substrate is reduced, thereby achieving an improvement in productivity.

Still yet another object is to provide a method of and an apparatus for manufacturing erbium-doped optical fibers, wherein the manufacturing costs of an erbium-doped optical fiber substrate are reduced.

An additional object is to provide a method of and an apparatus for manufacturing erbium-doped optical fibers, wherein a uniform refractivity distribution of erbium-doped optical fibers is achieved.

A further object is to provide a method of and an apparatus for manufacturing erbium-doped optical fibers, wherein no heater is employed to dry the interior of a quartz tube, thereby avoiding an occurrence of unnecessary costs and a generation of errors in the manufacture.

In accordance with one aspect, the present invention provides a method for manufacturing erbium-doped optical fibers usable as optical amplifiers, comprising the steps of: (a) clamping, to a clamping chuck, a connecting tube having one end connected to one end of a quartz tube adapted to manufacture a substrate for optical fibers; (b) supplying raw material to the interior of the quartz tube; (c) rotating the quartz tube while heating the quartz tube by an external heating source which reciprocates in a longitudinal direction on the quartz tube, thereby forming a particle deposition on the inner surface of the quartz tube while sintering and transparentizing the particle deposition; (d) repeating the step (c), thereby forming a clad layer on the inner surface of the quartz tube; (e) repeating the step (c) while varying the amount of the raw material from that at the step (d), thereby forming a core layer on the clad layer; (f) closing the other end of the quartz tube; (g) separating the connecting tube along with the quartz tube from the clamping chuck; (h) injecting a solution containing erbium and other additive elements into the quartz tube, thereby absorbing the solution in the core layer of the quartz tube; (i) removing the solution from the quartz tube after a predetermined period of time elapses; (j) clamping again the connecting tube along with the quartz tube to the clamping chuck; (k) opening again the closed end of the quartz tube; (l) injecting a large amount of gas into the quartz tube; (m) heating the connecting tube by the heating source to a predetermined temperature, thereby warming the gas introduced in the quartz tube; (n) rotating the clamping chuck to uniformly heat the quartz tube, thereby slowly drying the solution absorbed in the core layer of the quartz tube; and (o) heating again the quartz tube by the heating source, thereby softening the quartz tube, and completely sealing both ends of the quartz tube, thereby obtaining an optical fiber substrate having a hollow cylindrical structure.

In accordance with another aspect, the present invention provides an apparatus for manufacturing a substrate of erbium-doped optical fibers by absorbing a solution containing erbium and other additive elements in a quartz tube, which is deposited with a clad layer and a core layer, and drying the interior of the quartz tube, comprising: a clamping chuck for clamping and rotating the quartz tube deposited with the clad layer and the core layer; a connecting tube connected to the quartz tube and adapted to connect the quartz tube to the clamping chuck; a gas source for supplying gas to the interior of the quartz tube; and a heating source for warming the gas introduced in the interior of the quartz tube, thereby slowly and uniformly drying the quartz tube, which is absorbed with erbium.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A method for manufacturing a substrate of erbium-doped optical fibers using the MCVD method will now be described in conjunction with FIGS. 1 and 2.

Figure 2:
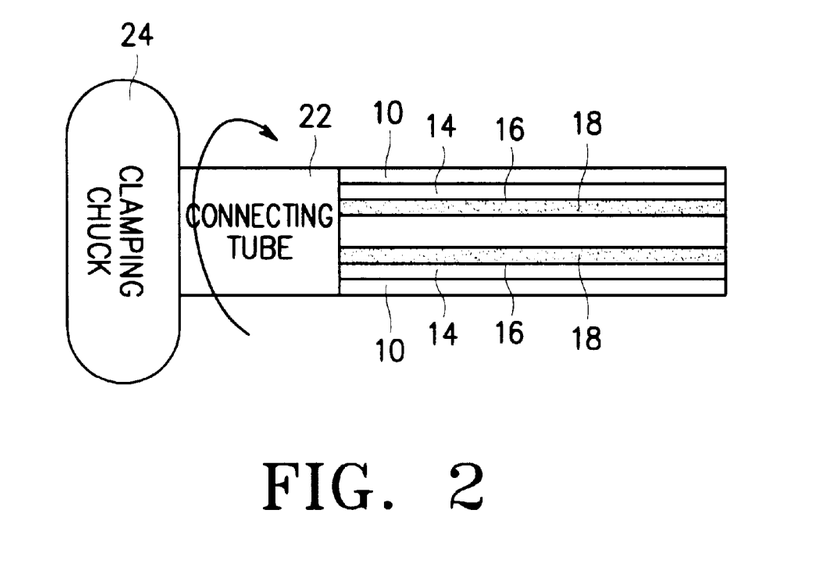
FIG. 2 is a schematic view illustrating an exemplary method for drying erbium-doped optical is fibers using a natural air-drying process.

In accordance with the MCVD method, a connecting tube 22 is first clamped at one end thereof on a clamping chuck 24 of a lathe (not shown), as shown in FIG. 2. A quartz tube 10, which is called "a supporting tube", is connected at the other end of connecting tube 22. Quartz tube 10 is used to manufacture an erbium-doped optical fiber substrate. Thereafter, raw material 38 such as $SiCl_4$ or $GeCl_4$ transported from a raw supply system (not shown) by a flow of oxygen is supplied to the interior of quartz tube 10.

Subsequently, quartz tube 10 is heated by an external heating source 26 (for example, an oxygen/hydrogen burner) while rotating. During the heating process, an oxidation reaction occurs in the interior of quartz tube 10. The oxidation reaction is expressed by the following formula:

In accordance with the oxidation reaction, particles of quartz-based oxides containing impurities are produced. The oxide particles exist in the form of a deposition 32 on the inner surface of quartz tube 10.

As the heating process is further carried out while heating source 26 reciprocates in a longitudinal direction on quartz tube 10, particulate deposition 32 is sintered on the inner surface of quartz tube 10 while being transparentized. As a result, a thin glass layer is formed on the inner surface of quartz tube 10. Thereafter, the above procedure is repeated until the glass layer on the inner surface of quartz tube 10 has a desired thickness.

During the formation of the glass layer, a portion of the glass layer corresponding to a clad layer 14 is first formed, and a portion of the glass layer corresponding to a core layer 16 is then formed. In order to manufacture erbium-doped optical fibers capable of directly amplifying optical signals to a desired high level without requiring a complicated signal processing by use of quartz tube 10 formed with clad layer 14 and core layer 16, quartz tube 10 is separated from clamping chuck 24 after being closed at its one end. Thereafter, a solution containing erbium and other additive elements is injected into the interior of quartz tube 10 closed at one end thereof.

Quartz tube 10 is then maintained in the above-mentioned condition for a desired period of time so as to allow erbium 18 to be absorbed in core layer 16 to a desired amount. After a desired period of time elapses, the solution is removed from quartz tube 10. At this time, core layer 16 has absorbed the solution containing erbium 18 and other additive elements. Subsequently, quartz tube 10 is clamped again on clamping chuck 24, and its closed end is then opened. Clamping chuck 24 then rotates to rotate quartz tube 10 so as to prevent the solution absorbed in core layer 16 from being sporadically concentrated in core layer 16, as shown in FIG. 2. Thereafter, quartz tube 10 is maintained for a long period of time as it is, so that the solution absorbed in quartz tube 10 can be air-dried.

After the erbium absorbed in quartz tube 10 is completely dried in the above process, quartz tube 10 is heated again at a high temperature using heating source 26, so that it is softened. Thereafter, both ends of quartz tube 10 are completely sealed. Thus, an erbium-doped optical fiber substrate having a hollow cylindrical structure is obtained.

However, the above-mentioned method involving the step of drying the solution containing erbium 18 and other additive elements absorbed in quartz tube 10 is problematic in that a long period of time is required to carry out the drying step because the drying step is processed in a natural air-dried state. This results in a lengthened manufacturing time of erbium-doped optical fiber substrates. As a result, the manufacturing productivity of erbium-doped optical fiber substrates is degraded. Furthermore, the costs of erbium-doped optical fiber substrates increase. In addition, a sporadic undrying phenomenon may occur because quartz tube 10 is dried in a natural air-dried state. Such a sporadic undrying phenomenon results in a non-uniform refractivity distribution.

Figure 3:
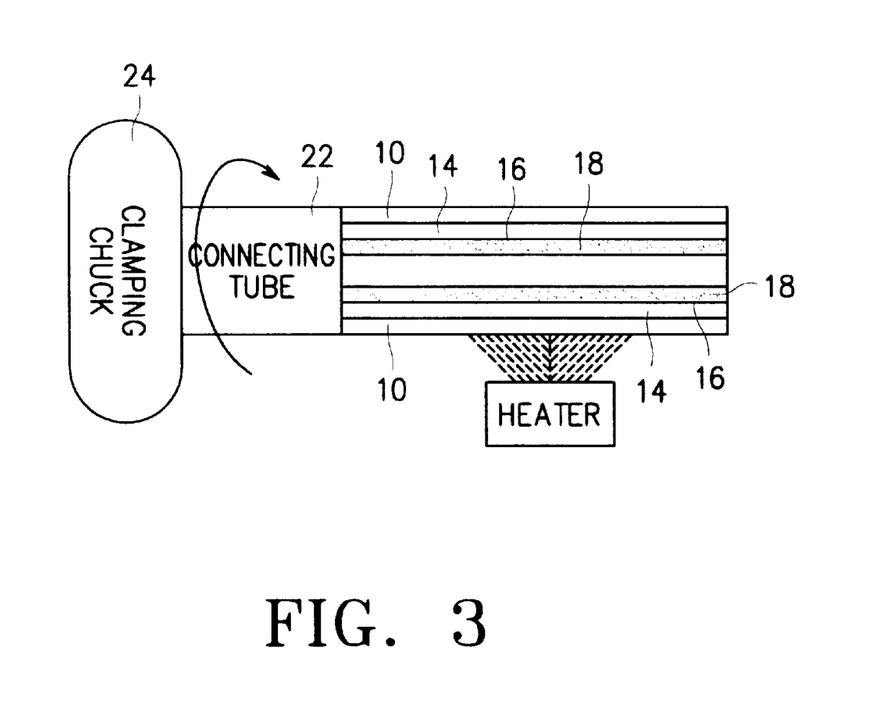
FIG. 3 is a schematic view illustrating another exemplary method for drying erbium-doped optical fibers using a heater.

Another method for manufacturing a substrate of erbium-doped optical fibers using the MCVD method will now be described in conjunction with FIGS. 1 and 3. In FIG. 3, elements respectively corresponding to those in FIG. 2 are denoted by the same reference numerals.

In accordance with this conventional method using the MCVD method, a connecting tube 22 is first clamped at one end thereof on a clamping chuck 24, as shown in FIG. 3. A quartz tube 10, which is called "a supporting tube", is connected at the other end of connecting tube 22. Quartz tube 10 is used to manufacture an erbium-doped optical fiber substrate. Thereafter, raw material 38 such as $SiCl_4$ or $GeCl_4$ transported from a raw supply system by a flow of oxygen is supplied to the interior of quartz tube 10.

Subsequently, quartz tube 10 is heated by an external heating source 26 (for example, an oxygen/hydrogen burner) while rotating. During the heating process, an oxidation reaction occurs in the interior of quartz tube 10. The oxidation reaction is expressed by the following formula:

$SiCl_4 + O_2 \rightarrow SiO_2 + 2Cl_2$ $GeCl_4 + O_2 \rightarrow GeO_2 + 2Cl_2$ In accordance with the oxidation reaction, particles of quartz-based oxides containing impurities are produced. The oxide particles exist in the form of a deposition 32 on the inner surface of quartz tube 10.

As the heating process is further carried out while heating source 26 reciprocates in a longitudinal direction on quartz tube 10, particle deposition 32 is sintered on the inner surface of quartz tube 10 while being transparentized. As a result, a thin glass layer is formed on the inner surface of quartz tube 10. Thereafter, the above procedure is repeated until the glass layer on the inner surface of quartz tube 10 has a desired thickness.

During the formation of the glass layer, a portion of the glass layer corresponding to a clad layer 14 is first formed, and a portion of the glass layer corresponding to a core layer 16 is then formed. In order to manufacture erbium-doped optical fibers capable of directly amplifying optical signals to a desired high level without requiring a complicated signal processing by use of quartz tube 10 formed with clad layer 14 and core layer 16, quartz tube 10 is separated from clamping chuck 24 after being closed at its one end. Thereafter, a solution containing erbium and other additive elements is injected into the interior of quartz tube 10 closed at one end thereof.

Quartz tube 10 is then maintained in the above-mentioned condition for a desired period of time so as to allow erbium 18 to be absorbed in core layer 16 to a desired amount. After a desired period of time elapses, the solution is removed from quartz tube 10. At this time, core layer 16 has absorbed the solution containing erbium 18 and other additive elements. Subsequently, quartz tube 10 is clamped again on clamping chuck 24, and its closed end is then opened.

Clamping chuck 24 then rotates to rotate quartz tube 10 so as to prevent the solution absorbed in core layer 16 from being sporadically concentrated in core layer 16, as shown in FIG. 3. During the rotation of quartz tube 10, the outer surface of quartz tube 10 is slowly heated by a heater 30 at a low temperature while heater 30 reciprocates in a longitudinal direction on quartz tube 10, thereby causing the solution absorbed in quartz tube 10 to be slowly dried. After the erbium absorbed in quartz tube 10 is completely dried in accordance with the above process, quartz tube 10 is heated again by a heating source 26 at a high temperature, so that it is softened. Thereafter, both ends of quartz tube 10 are completely sealed. Thus, an erbium-doped optical fiber substrate having a hollow cylindrical structure is obtained.

Where the solution containing erbium 18 and other additive elements absorbed in quartz tube 10 is dried in accordance with the above-mentioned method shown in FIG. 3, it is possible to greatly reduce the drying time, as compared to the method of FIG. 2 using the natural air-drying process. This is because the outer surface of quartz tube 10 is slowly heated by heater 30 at a warm temperature while heater 30 reciprocates in a longitudinal direction on quartz tube 10, thereby causing the solution absorbed in quartz tube 10 to be dried. Even in this case, however, several hours are required to dry quartz tube 10. As a result, this method is also problematic in that a long period of time is taken to manufacture erbium-doped optical fiber substrates. As a result, the manufacturing productivity of erbium-doped optical fiber substrates is degraded. Furthermore, the costs of erbium-doped optical fiber substrates increase. In addition, a sporadic undrying phenomenon may occur because quartz tube 10 is dried using heat generated by heater 30. Such a sporadic undrying phenomenon results in a non-uniform refractivity distribution. Since heater 30 is used to dry quartz tube 10, additional time and costs are required to install heater 30. Moreover, an erroneous installation of heater 30 may cause errors in the manufacture of erbium-doped optical fiber substrates.

Figure 4A:
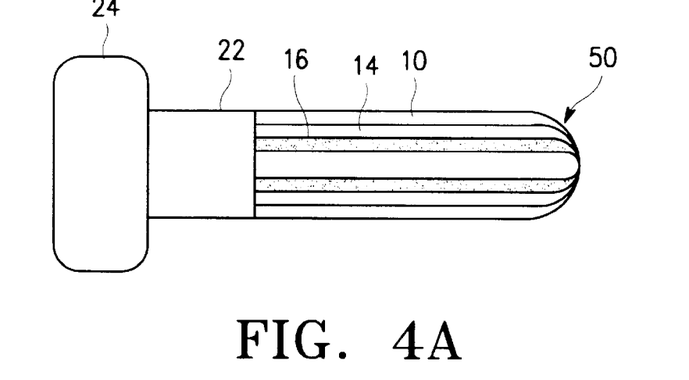
FIG. 4 is a schematic view illustrating a method for drying erbium-doped optical fibers using a heating source (an oxygen/hydrogen burner) according to the principles of the present invention.
Figure 4B:
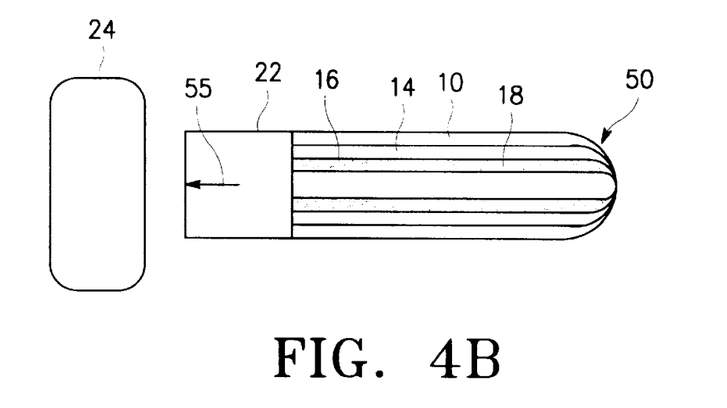
Figure 4C:
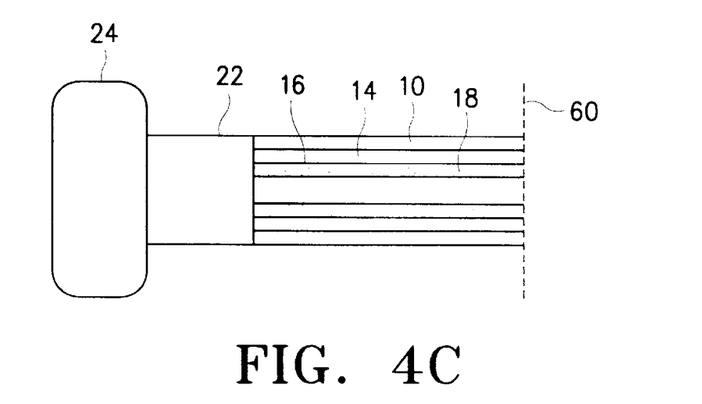

Referring now to FIG. 4, an apparatus for manufacturing erbium-doped optical fibers in accordance with an embodiment of the present invention is illustrated. In FIG. 4, elements respectively corresponding to those in FIGS. 2 and 3 are denoted by the same reference numerals. In particular, the apparatus is used to dry a solution containing erbium and other additive elements absorbed in a quartz tube in the manufacture of an erbium optical fiber substrate using the MCVD method in accordance with the present invention.

Figure 1:
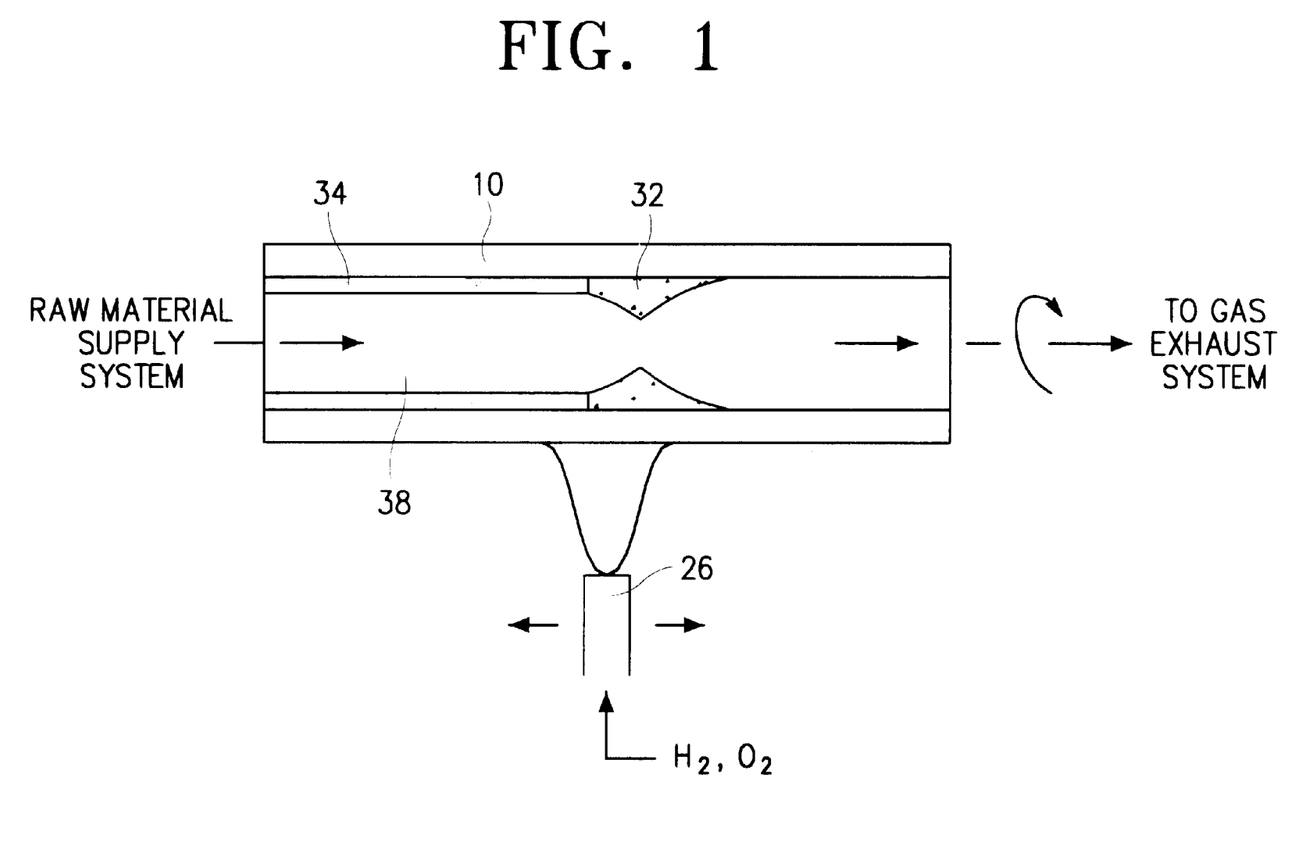
FIG. 1 is a schematic view illustrating a process for manufacturing optical fibers in accordance with an exemplary MCVD method.

As shown in FIGS. 1 and 4, the apparatus includes a chuck 24 which serves to fix a quartz tube 10 deposited with a clad layer 14 and a core layer 16 in accordance with the MCVD method and to rotate the fixed quartz tube 10. A connecting tube 22 is fixedly mounted to one end of chuck 24. Connecting tube 22 serves to connect quartz tube 10 to chuck 24. Beneath connecting tube 22, a heating source 26 is disposed to generate heat for slowly drying quartz tube 10 which is absorbed with a solution containing erbium 18 and other additive elements. In quartz tube 10, a desired amount of gas from gas source 20 is also introduced. In order to increase the efficiency in drying the interior of quartz tube 10, oxygen is used as the gas. For heating source 26, an oxygen/hydrogen burner is used which is supplied only with hydrogen during ignition, and a mixture of hydrogen and oxygen during a heating process.

Figure 5:
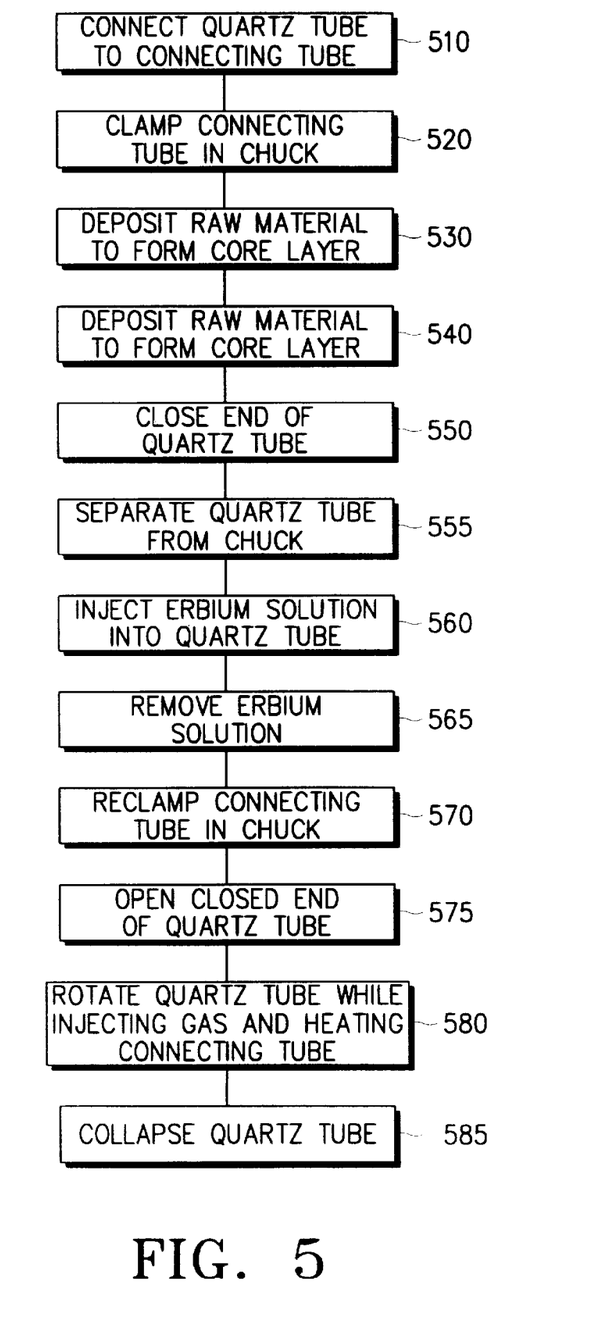
FIG. 5 is a flow diagram illustrating a method for manufacturing optical fibers according to present invention.

Now, a method for fabricating erbium-doped optical fibers using the above-mentioned apparatus in accordance with the present invention will be described in detail in conjunction with FIGS. 1 and 4 and flow diagram FIG. 5. In accordance with the method of the present invention using the MCVD process, quartz tube 10, which is used to manufacture an erbium-doped optical fiber substrate, is first connected to connecting tube 22 (Step 510). This connecting tube 22 is then clamped on clamping chuck 24 (Step 520), as shown in FIG. 4. Thereafter, raw material 38 such as a $SiCl_4$ gas or a $GeCl_4$ gas transported from a raw supply system by a flow of oxygen $O_2$ is supplied to the interior of quartz tube 10, such that the flow rate of the oxygen controls the feeding of the raw material into quartz tube 10. Additionally, the $SiCl_4$ gas may be doped with a $GeCl_4$ gas and transported by the $O_2$ carrier.

Subsequently, quartz tube 10 is heated by external heating source 26, namely, the oxygen/hydrogen burner, while rotating it by clamping chuck 24. During the heating process, an oxidation reaction occurs in the interior of quartz tube 10. The oxidation reaction is expressed by the following formula:

$SiCl_4 + O_2 \rightarrow SiO_2 + 2Cl_2$ $GeCl_4 + O_2 \rightarrow GeO_2 + 2Cl_2$ In accordance with the oxidation reaction, particles of quartz-based oxides containing impurities are produced. The oxide particles exist in the form of a deposition 32 on the inner surface of quartz tube 10.

As the heating process is further carried out while heating source 26 reciprocates in a longitudinal direction on quartz tube 10, particle deposition 32 is sintered on the inner surface of quartz tube 10 while being transparentized. As a result, a thin glass layer is formed on the inner surface of quartz tube 10. Thereafter, the above procedure is repeated until the glass layer on the inner surface of quartz tube 10 has a desired thickness. During the formation of the glass layer, a portion of the glass layer corresponding to a clad layer 14 is first formed (Step 530), and a portion of the glass layer corresponding to a core layer 16 is then formed (Step 540). The formation of core layer 16 is achieved by varying the amount of raw material 38 from that used in the formation of clad layer 14. Additionally, the amount of raw material used to form the core layer can be varied as each layer of the core layer is varied.

In order to manufacture erbium-doped optical fibers capable of directly amplifying optical signals to a desired high level without requiring a complicated signal processing by use of quartz tube 10 formed with clad layer 14 and core layer 16, quartz tube 10 is first closed at its one end (Step 550). The reason why quartz tube 10 is closed at its one end is because when a solution containing erbium 18 and other additive elements is injected into the interior of quartz tube 10, the solution and erbium 18 may leak from the interior of quartz tube 10. Quartz tube 10 is then separated from clamping chuck 24 (Step 555). Thereafter, a solution containing erbium and other additive elements is injected into the interior of quartz tube 10 closed at one end thereof (Step 560).

Quartz tube 10 is then maintained in the above-mentioned condition for a desired period of time so as to allow the erbium 18 to be absorbed in core layer 16 to a desired amount. At this time, core layer 16 has particles of an incomplete glass structure in order to allow the solution containing erbium 18 and other additive elements to penetrate easily therein. After a desired period of time elapses, the solution is removed from quartz tube 10 (Step 565). At this time, core layer 16 has absorbed the solution containing erbium 18 and other additive elements.

Subsequently, quartz tube 10 is clamped on clamping chuck 24 (Step 570), and its closed end is then opened (Step 575). A large amount of gas from gas source 20 is then fed into the interior of quartz tube 10, as shown in FIG. 4, and using heating source 26, connecting tube 22 is uniformly heated at a temperature equal to or lower than the volatilization point of nitric acid. Oxygen is used as the gas to increase the drying efficiency. During the heating, clamping chuck 24 rotates to rotate quartz tube 10 so as to uniformly heat connecting tube 22 to uniformly heat the gas, namely, oxygen, while preventing the solution absorbed in core layer 16 from being sporadically concentrated in core layer 16 (Step 580). By this heating, the solution containing erbium 18 and other additive elements is slowly dried.

After the erbium absorbed in quartz tube 10 is completely dried in the above process, quartz tube 10 is heated again at a high temperature using heating source 26, so that it is softened. Thereafter, quartz tube 10 may be collapsed (Step 585) into a condensed erbium-doped optical fiber preform, or both ends of quartz tube 10 may be completely sealed to form an erbium-doped optical fiber preform having a hollow cylindrical structure.

In accordance with the above-mentioned method and apparatus of the present invention, it is possible to greatly reduce the time taken to manufacture erbium-doped optical fibers for optical amplifiers. In the manufacture of erbium-doped optical fibers using a solution adding method, the time taken to dry the solution is dependent on the condition of the core layer. Where it is assumed that the same core layers are formed using the same erbium-containing solutions, respectively, the method of FIG. 2 using a heater can reduce the drying time to about ⅕ of the drying time taken in the natural air-drying method of FIG. 2. In accordance with the present invention, it is possible to reduce the drying time to about ½ of the drying time taken in the method of FIG. 3 using a heater.

Accordingly, the present invention provides an effect of reducing the time taken to manufacture an erbium-doped optical fiber substrate. This results in a greatly reduced manufacturing time of erbium-doped optical fiber substrates. As a result, the manufacturing productivity of erbium-doped optical fiber substrates is improved. Furthermore, the costs of erbium-doped optical fiber substrates are greatly reduced. Since oxygen is supplied to the interior of the quartz tube and heated at an appropriate temperature, the erbium solution absorbed in the quartz tube can be uniformly dried in the rotation direction of the quartz tube and in the longitudinal direction of the quartz tube. Accordingly, it is possible to prevent a sporadic undrying phenomenon from occurring in the interior of the quartz tube. In addition, it is not required to use any additional heating device such as a heater because the interior of the quartz tube is dried by the heating source used for the deposition of the clad and core layers. Accordingly, it is possible to eliminate a loss of time and process errors resulting from the installation of a separate heating device.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for manufacturing erbium-doped optical fibers usable as optical amplifiers, comprising the steps of:

connecting a first end of a quartz tube to a connecting tube;

clamping said connecting tube in a clamping chuck of a lathe;

supplying a first amount of raw material, used for forming a clad layer, into said quartz tube;

rotating said quartz tube while simultaneously heating said quartz tube to form said clad layer;

supplying a second amount of said raw material, used for forming a core layer, into said quartz tube, wherein said second amount is different from said first amount;

rotating said quartz tube while simultaneously heating said quartz tube to form said core layer on said clad layer;

closing a second end of said quartz tube;

separating said connecting tube along with said quartz tube, said quartz tube now having a closed second end, from said clamping chuck;

injecting a solution containing erbium into said quartz tube;

removing said solution from said quartz tube after a predetermined time period during which a desired amount of said solution is absorbed into said core layer;

re-clamping said connecting tube in said clamping chuck;

opening said closed second end of said quartz tube after said re-clamping step;

rotating said quartz tube while simultaneously injecting a gas into said quartz tube via said connecting tube;

heating said connecting tube to a predetermined temperature for heating said gas so as to dry said solution absorbed into said core layer;

softening said quartz tube by heating said quartz tube, after said solution is dried, while rotating said quartz tube; and collapsing said quartz tube to form a condensed doped optical fiber preform.

2. The method as set forth in claim 1, wherein said raw material comprises $SiCl_4$.

3. The method as set forth in claim 2, further comprising controlling a flow rate of said $SiCl_4$ by utilizing an $O_2$ carrier.

4. The method as set forth in claim 1, wherein said raw material comprises $GeCl_4$.

5. The method as set forth in claim 1, wherein said gas injected into said quartz tube comprises oxygen.

6. The method as set forth in claim 1, wherein said predetermined temperature to which said connecting tube is heated is equal to a volatilization temperature of nitric acid.

7. The method as set forth in claim 1, further comprising the steps of:

repeating said steps of supplying a first amount of raw material into said quartz tube and rotating said quartz tube while simultaneously heating said quartz tube to form said clad layer, until a desired thickness of said clad layer is formed.

8. The method as set forth in claim 7, further comprising the steps of:

repeating said steps of supplying a second amount of said raw material into said quartz tube and rotating said quartz tube while simultaneously heating said quartz tube to form said core layer, until a desired thickness of said core layer is formed.

9. The method as set forth in claim 8, wherein said second amount of said raw material is varied each time said steps of supplying a second amount of said raw material into said quartz tube and rotating said quartz tube while simultaneously heating said quartz tube to form said core layer is repeated.

10. A method for manufacturing a substrate of erbium-doped optical fibers from a quartz tube deposited with a clad layer and a core layer and having a connecting tube attached to one end thereof, said method comprising the steps of:

closing an opposite end of a quartz tube;

injecting a solution containing erbium and other additive elements into said quartz tube having the closed opposite end;

removing said solution from said quartz tube after a predetermined period of time elapses during which a desired amount of said solution is absorbed into said core layer;

clamping said connecting tube to a clamping chuck of a lathe;

opening said opposite end of said quartz tube after clamping said connecting tube to said clamping chuck;

feeding a gas into said quartz tube;

utilizing a heater to apply heat directly to said connecting tube to heat said connecting tube to a predetermined temperature for heating said gas injected into said quartz tube while simultaneously rotating said connecting tube in said clamping chuck in order to dry said solution absorbed in said core layer;

softening said quartz tube by reciprocally moving said heater along a length of said quartz tube while rotating said connecting tube in said clamping chuck; and sealing both ends of said softened quartz tube to form an erbium-doped optical fiber preform having a hollow cylindrical structure.

11. The method as set forth in claim 10, wherein said gas injected into said quartz tube comprises oxygen.

12. The method as set forth in claim 10, wherein said predetermined temperature to which said connecting tube is heated is equal to a volatilization temperature of nitric acid.

13. The method as set forth in claim 10, further comprising the steps of:

supplying said heater with hydrogen during an ignition operation; and supplying said heater with hydrogen and oxygen when applying heat to one of said connecting tube and said quartz tube.

* * * * *